OR 3,877,793

United St [11] 3,877,793
Nakagawa [45] Apr. 15, 1975

[54] ZOOM LENS CASING

[75] Inventor: Sadao Nakagawa, Tokyo, Japan

[73] Assignee: Nippon Kogaku K.K., Tokyo, Japan

[22] Filed: July 26, 1973

[21] Appl. No.: 382,948

[30] Foreign Application Priority Data
Sept. 26, 1972 Japan.............................. 47-110920

[52] U.S. Cl................................. 350/187; 350/255
[51] Int. Cl........................ G02b 15/00; G02b 7/02
[58] Field of Search..................... 350/187, 186, 255

[56] References Cited
UNITED STATES PATENTS
3,523,719 8/1970 Bach................................... 350/187
3,784,285 1/1974 Watanabe et al.................. 350/187

Primary Examiner—Ronald L. Wibert
Assistant Examiner—Conrad Clark
Attorney, Agent, or Firm—Shapiro and Shapiro

[57] ABSTRACT

A casing assembly for a zoom lens of small telephoto ratio, i.e. of small size, comprises a rotatable cylinder disposed between a distance and zooming ring and a first lens-group fitting and rotatable about the optical axis with respect to a stationary cylinder. The rotatable cylinder has a groove formed to extend axially thereof and a pin formed thereon. The pin is engaged in a groove extending axially in the first lens-group fitting. The distance and zooming ring has a pin formed thereon and is engaged in the groove formed in the rotatable cylinder. Thus, a pin-in groove arrangement establishes a connection between the rotatable cylinder and the distance and zooming ring.

4 Claims, 3 Drawing Figures

ZOOM LENS CASING

BACKGROUND OF THE INVENTION

1. Field of the Invention

This invention relates to a zoom lens casing.

2. Description of the Prior Art

The recent advance of optical glass materials has eliminated the problem of chromatic aberration which was a barrier to the provision of small-sized telephoto zoom lenses. This has made it feasible to design the telephoto ratio as small as the correction limit of the image plane curvature.

It has thus become possible to reduce the size of the optical system for the known single-operation type zoom lenses (i.e. the zoom lenses of the type in which the focusing and zooming may be accomplished by actuating a single operating ring for rotation and rectilinear movement). However, it still has not been known how to reduce the size of the casing for such a single-operation type zoom lens.

SUMMARY OF THE INVENTION

It is an object of the present invention to provide a zoom lens casing assembly smaller in size than the conventional ones by forming a groove for the focusing axial movement and a groove for the zooming axial movement separately from each other by forming the latter groove and camming grooves so as to extend the location of the helicoid portion of a first lens-group fitting.

To achieve the above object, the casing assembly of the present invention comprises a rotatable cylinder disposed between a distance and zooming ring and a first lens-group fitting and rotatable about the optical axis of the lens with respect to a stationary cylinder. A groove is formed to extend axially in the rotatable cylinder, and a pin is provided on the rotatable cylinder. The pin is engaged in a groove formed to extend axially in the first lens--group fitting. A pin is formed on the distance and zooming ring and is engaged in the groove formed in the rotatable cylinder. Thus, the rotatable cylinder and the distance and zooming ring are connected together by the pin and groove arrangement.

A limit cylinder may be secured to the stationary cylinder to limit the axial movement of the distance and zooming ring. The limit cylinder has a cut-away portion formed peripherally thereof and is engaged with another pin formed on the rotatable cylinder so as to allow rotation of the distance and zooming ring.

The invention will become fully apparent from the following detailed description taken in conjunction with the accompanying drawings.

DESCRIPTION OF THE PREFERRED EMBODIMENTS

Figure 1:
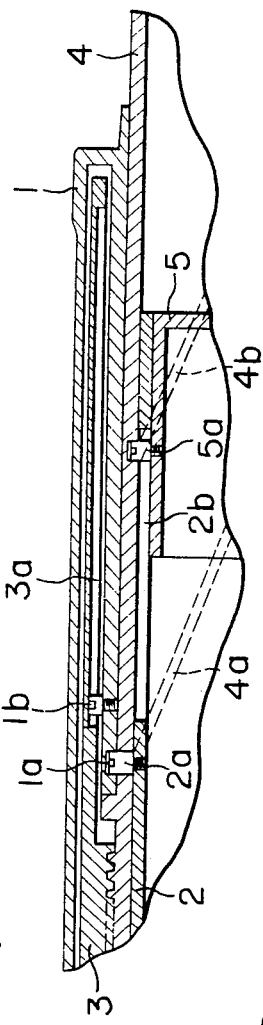
FIG. 1 is a fragmentary, longitudinal section of the essential portion of a single-operation type zoom lens casing assembly according to the prior art.

In the single-operation type zoom lens casing assembly of the prior art shown in FIG. 1, a distance and zooming ring 1 is rotated. A second lens-group fitting 2 remains immovable since a pin 2a secured to the fitting 2 and received in a peripheral groove 1a formed peripherally of the ring 1 is unaffected by the rotation of the ring 1. On the other hand, a first lens-group fitting 3 is rotated in response to the rotation of the ring 1 since a pin 1b secured to the ring 1 is engaged in a groove 3a which extends axially in the first lens-group fitting 3, and at the same time the first lens-group fitting 3 is moved axially by means of its helicoid portion. Thus, the rotation of the distance and zooming lens 1 furnishes the desired focusing.

Thereafter, when the ring 1 is moved axially, a second lens-group fitting 2 with a pin 2a is moved under control of a camming groove 4a formed in a stationary cylinder 4 and of a peripheral groove 1a in the ring 1. The rotation of the second lens-group fitting 2 causes movement of a pin 5a of a third lens-group fitting 5 which is engaged in a groove 4a formed in the stationary cylinder 4 and in a groove 2b formed to extend axially in the second lens-group fitting and also causes movement of the third lens-group fitting thus accomplishing the zooming.

Where such a mechanism is applied to a zooming optical system of small telephoto ratio, i.e. of small size, the groove 3a must be long enough to allow the axial movement of the lens both for focusing and for zooming and the helicoid portion must be located to overlie the first lens-group, thus resulting in an overall length and diameter greater than the optical system. This offsets the small size of the optical system.

Figure 2:
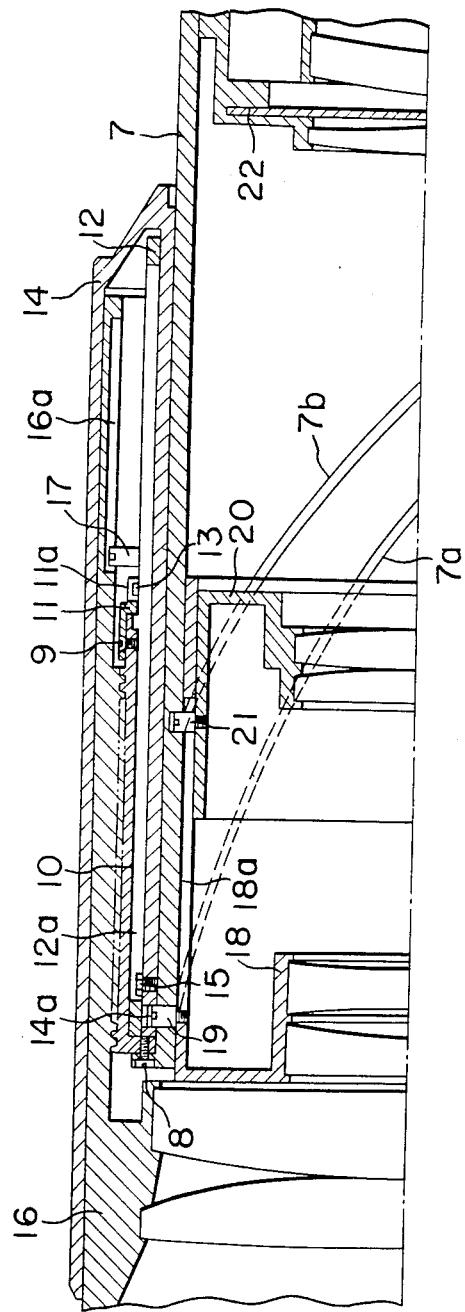
FIG. 2 is a fragmentary, longitudinal section of the essential portion of a zoom lens casing assembly according to the present invention.

As shown in FIG. 2, a helicoid portion 10 and a limit cylinder 11 are secured to a stationary cylinder 7 by means of screws 8, 9. A rotatable cylinder 12 is rotatably mounted between the helicoid portion 10 and a distance and zooming ring 14. The rotatable cylinder 12 and the lilmit cylinder 11 are related so that the axial movement of the ring 14 is limiited by the limit cylinder and the ring 14 is rotatable due to the engagement between a cut-away portion 11a formed peripherally of the limit cylinder 11 and a pin 13 secured to the rotatable cylinder 12, the rotation of the ring 14 being limited to the extent required to move a later-described first lens-group fitting from the infinity position to the close-up position. The rotatable cylinder 12 and the distance and zooming ring 14 are connected together by the engagement of a pin 15 secured to the ring positioned in a groove 12a extending axially in the rotatable cylinder.

Still referring to FIG. 2, the first lens-group fitting 16 is threadably engaged with the helicoid portion 10, and the fitting 16 and the rotatable cylinder 12 are connected together by the engagement of a pin 17 fixed to the cylinder in a groove 16a formed to extend axially in the fitting 16. A pin 19 is provided on a second lens-group fitting 18 and engaged both in a peripheral groove 14a formed peripherally of the ring 14 and in a camming groove 7a formed in the stationary cylinder 7. A pin 21 is provided on a third lens-group fitting 20 and engaged both in a camming groove 7b formed in the stationary cylinder 7 and in a groove 18a formed to extend axially in the second lens-group fitting 18.

Figure 3:
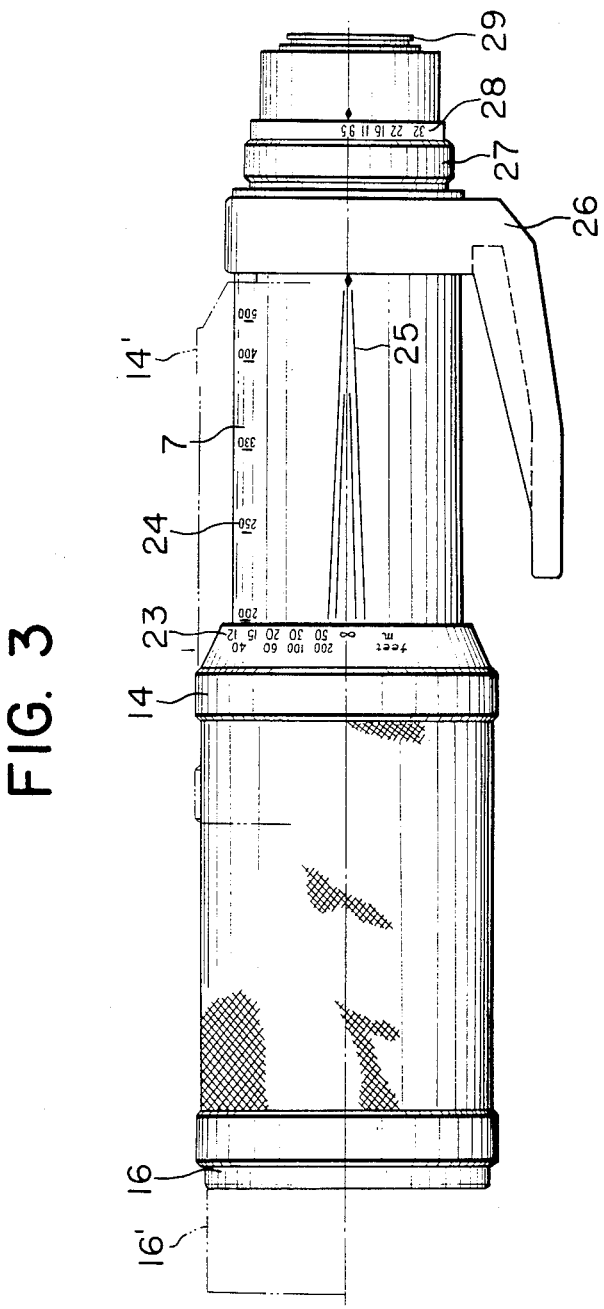
FIG. 3 is an elevational view of the zoom lens casing assembly shown in FIG. 2.

Referring to FIGS. 2 and 3, 22 designates an aperture blade. A distance scale 23 is provided on the distance and zooming ring 14. A focal distance scale 24 and a reference mark and depth-of-field scale 25 are provided on the stationary cylinder 7. The assembly includes a tripod seat 26 having a click at every 90° circumferentially thereof and a fixing clamp (not shown). An aperture ring 27 having an aperture scale is provided, and the assembly includes a mount 29 to enable connecting the zoom lens to a camera body.

The operation of the device will now be described. The distance and zooming ring 14 is rotated. Since this rotation does not affect the pin 19 engaged in the peripheral groove 14a, the second and third lens-group fittings 18 and 20 remain stationary to maintain the focal distance unchanged. On the other hand, the rotatable cylinder 12 is caused to rotate due to the engagement between the pin 15 and the groove 12a. At the same time, the first lens-group fitting 16 is caused to rotate due to the engagement between the pin 17 fixed to the rotatable cylinder in the axially extending groove 16a of the fitting, the fitting thereby being moved axially with the aid of its threadable engagement with the helicoid portion 10. Subsequently, the ring 14 is moved axially to impart a force to the pin 19, whereby the second and third lens-group fittings 18 and 20 are moved in the same manner as described with respect to FIG. 1, thus accomplishing the zooming. During this stage, the pin 15 on the ring 14 moves forward in the groove 12a axially of the optical system, whereas the first lens-group fitting 16 remains stationary because there is then no rotational force imparted to the rotatable cylinder 12.

As the distance and zooming ring 14 is so rotated to approach the close-up position, the first lens-group fitting 16 is moved axially to the position indicated by phantom line 16' (FIG. 3). In this position of the fitting 16, the pin 17 is brought to its extreme right position in the groove 16a. In the relationship of the parts shown in FIG. 2, the pin 17 is shown in the opposite or extreme left portion within the groove of the first lens-group fitting. The groove 16a may be rectilinear, or non-rectilinear. As the distance and zooming ring 14 is moved back, to the right as viewed in FIG. 3, the second and third lens-group fittings 18 and 20 are moved under control of the camming grooves 7a and 7b formed in the stationary cylinder 7 including the master lens of the optical system, thus continuously changing the focal distance to the phantom-line position 14' attained for the maximum movement. In this position, and with reference to FIG. 2, the pin 15 is brought to its extreme right position in the groove 12a of the rotatable cylinder 12.

According to the present invention, the axially extending groove 16a for providing for focusing movement and the groove 12a for providing the zooming movement may be formed separately from each other, and the groove 12a and camming grooves 7a, 7b may be formed so as to extend to the location of the helicoid portion 10, thereby providing a smaller size than that of the conventional zoom lens casing. Moreover, the axial length over which the helicoid portion is engaged can be made sufficiently long to enhance the accuracy and yet reduce the overall length of the lens casing, thereby reducing the effective diameter of the optical system. This solves the difficult problem that when a longer casing is used for small-sized optical system of small telephoto ratio, the effective diameter of the optical system must be increased to prevent the bounce of the image-forming light beam and the diameter of the lens casing must also be increased because the helicoid portion and other mechanisms are so located as to overlie even the first lens-group fitting.

It is believed that the advantages and improved results afforded by the zoom lens casing of the invention will be apparent from the foregoing description of a preferred embodiment of the invention. Various changes and modifications may be made without departing from the spirit and scope of the invention as sought to be defined in the following claims.

I claim:

1. A casing assembly for a zoom lens of small telephoto ratio comprising a distance and zooming ring rotatably and axially movable to effect focusing and zooming, the ring having a peripheral groove and a pin; a stationary cylinder having camming grooves formed therein; a first lens-group fitting having a helicoid portion threadably engaged therewith, the helicoid portion being secured to the stationary cylinder and the first lens-group fitting having an axially extending groove, a rotatable cylinder mounted between the helicoid portion and the distance and zooming ring, the rotatable cylinder having an axially extending groove and a pin; the rotatable cylinder and the distance and zooming ring being connected by the engagement of the pin on the distance and zooming ring and the groove in the rotatable cylinder; the first lens-group fitting and the rotatable cylinder being connected by the engagement of the pin on the rotatable cylinder and the groove in the fitting; a second lens-group fitting having an axially extending groove and a pin, the pin being engaged in the peripheral groove of the distance and zooming ring and a camming groove of the stationary cylinder; and a third lens-group fitting having a pin, the pin being engaged in a camming groove of the stationary cylinder and in a groove of the second lens-group fitting.

2. A casing assembly according to claim 1, wherein a limit cylinder is secured to the stationary cylinder to limit the axial movement of the distance and zooming ring, and the limit cylinder has a cut-away portion formed peripherally thereof and engaged with the pin on the rotatable cylinder to allow rotation of the distance and zooming ring.

3. A casing according to claim 1, wherein the groove in the first lens-group fitting is rectilinear.

4. A casing according to claim 1, wherein the groove in the first lens-group fitting is non-rectilinear.

* * * * *